(12) United States Patent
Naganawa et al.

(10) Patent No.: US 6,698,911 B2
(45) Date of Patent: Mar. 2, 2004

(54) VEHICLE CORNERING LAMP

(75) Inventors: Masahito Naganawa, Shizuoka (JP); Takao Watanabe, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 09/901,564

(22) Filed: Jul. 11, 2001

(65) Prior Publication Data
US 2002/0015308 A1 Feb. 7, 2002

(30) Foreign Application Priority Data

Jul. 11, 2000 (JP) ........................................ 2000-209670
Jun. 29, 2001 (JP) ........................................ 2001-197667

(51) Int. Cl.⁷ .............................................. F21V 21/29
(52) U.S. Cl. ........................ 362/464; 362/465; 362/466
(58) Field of Search ................................ 362/543, 544, 362/545, 247, 241, 465, 466, 240

(56) References Cited

U.S. PATENT DOCUMENTS

| | | | | |
|---|---|---|---|---|
| 4,225,906 A | * | 9/1980 | Guliksen et al. ............ 362/254 |
| 5,404,278 A | * | 4/1995 | Shibata et al. ............ 362/83.3 |
| 5,455,747 A | | 10/1995 | Aoyama ........................ 362/61 |
| 5,941,633 A | | 8/1999 | Saito et al. ................. 362/543 |
| 6,024,474 A | * | 2/2000 | Tanaka ........................ 362/544 |
| 6,270,241 B1 | * | 8/2001 | Collot et al. ................ 362/544 |
| 6,505,962 B2 | * | 1/2003 | Gotou ........................ 362/517 |

* cited by examiner

Primary Examiner—Stephen Husar
Assistant Examiner—Guiyoung Lee
(74) Attorney, Agent, or Firm—Sughrue Mion, PLLC

(57) ABSTRACT

A vehicle cornering lamp capable of broadly irradiating a road surface ahead of and in an oblique direction of a vehicle while the vehicle is moving around a curve. The vehicle cornering lamp includes three reflector units 12A, 12B, and 12C, whose light emitting directions are respectively set to angles of 30°, 45°, and 60°, with respect to the traveling direction of the vehicle. The vehicle cornering lamp also includes a control unit 20 for controlling light emission—from the reflector units 12A, 12B, and 12C—according to the travel conditions of the vehicle. When the vehicle turns to the left at an intersection, a traveling road onto which the vehicle will turn left, and a road shoulder, are sufficiently irradiated by switching on the reflector units 12A, 12B and 12C in the order of 12A→12B→12C→12B→12A, so that pedestrians can quickly be detected.

10 Claims, 13 Drawing Sheets

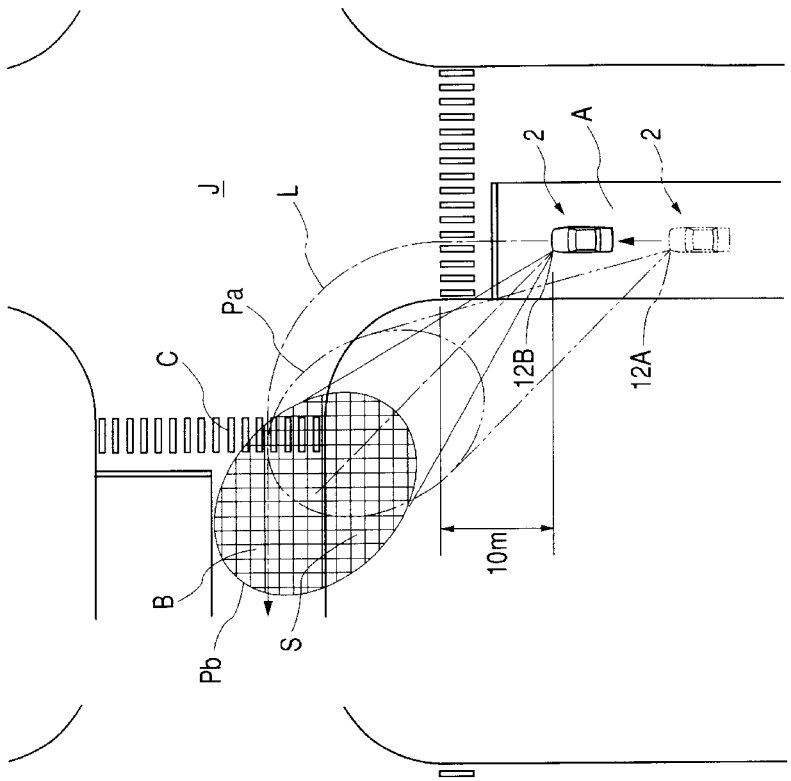
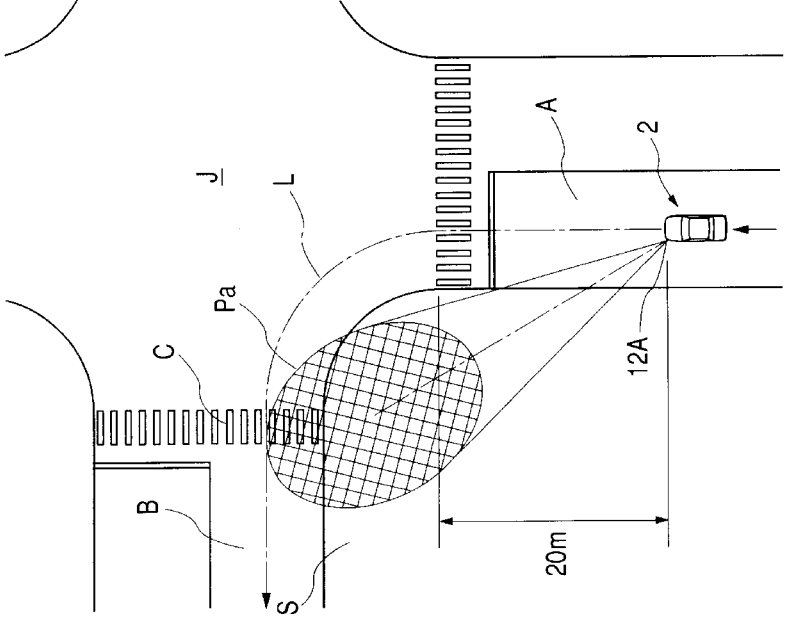
FIG. 4(a)
FIG. 4(b)

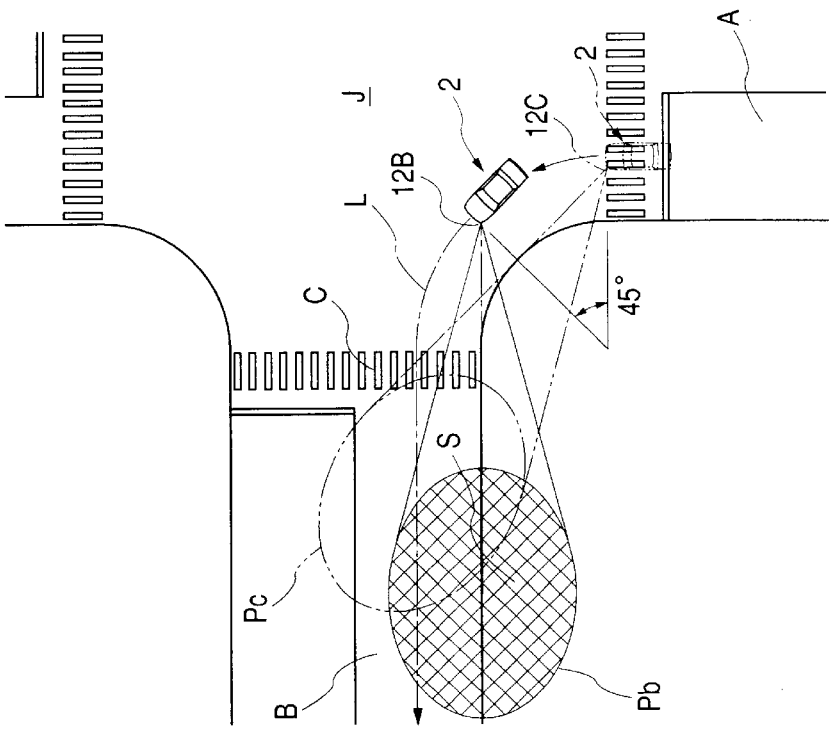
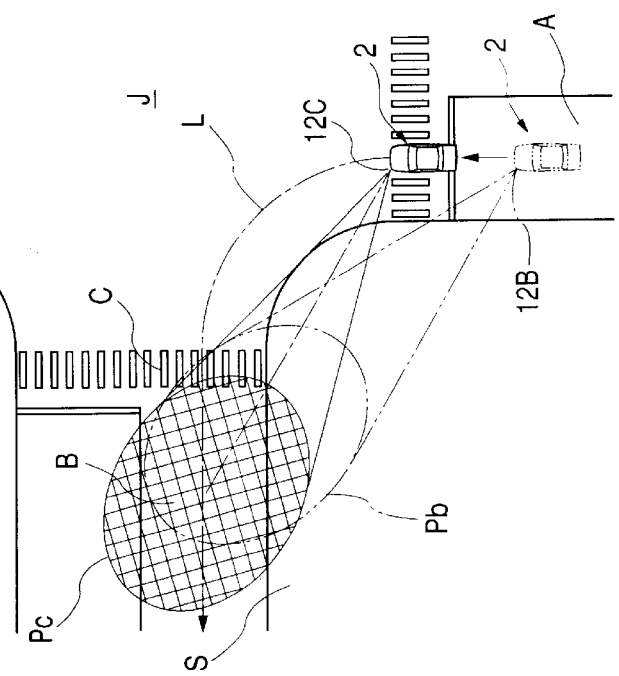
FIG. 5(a)
FIG. 5(b)

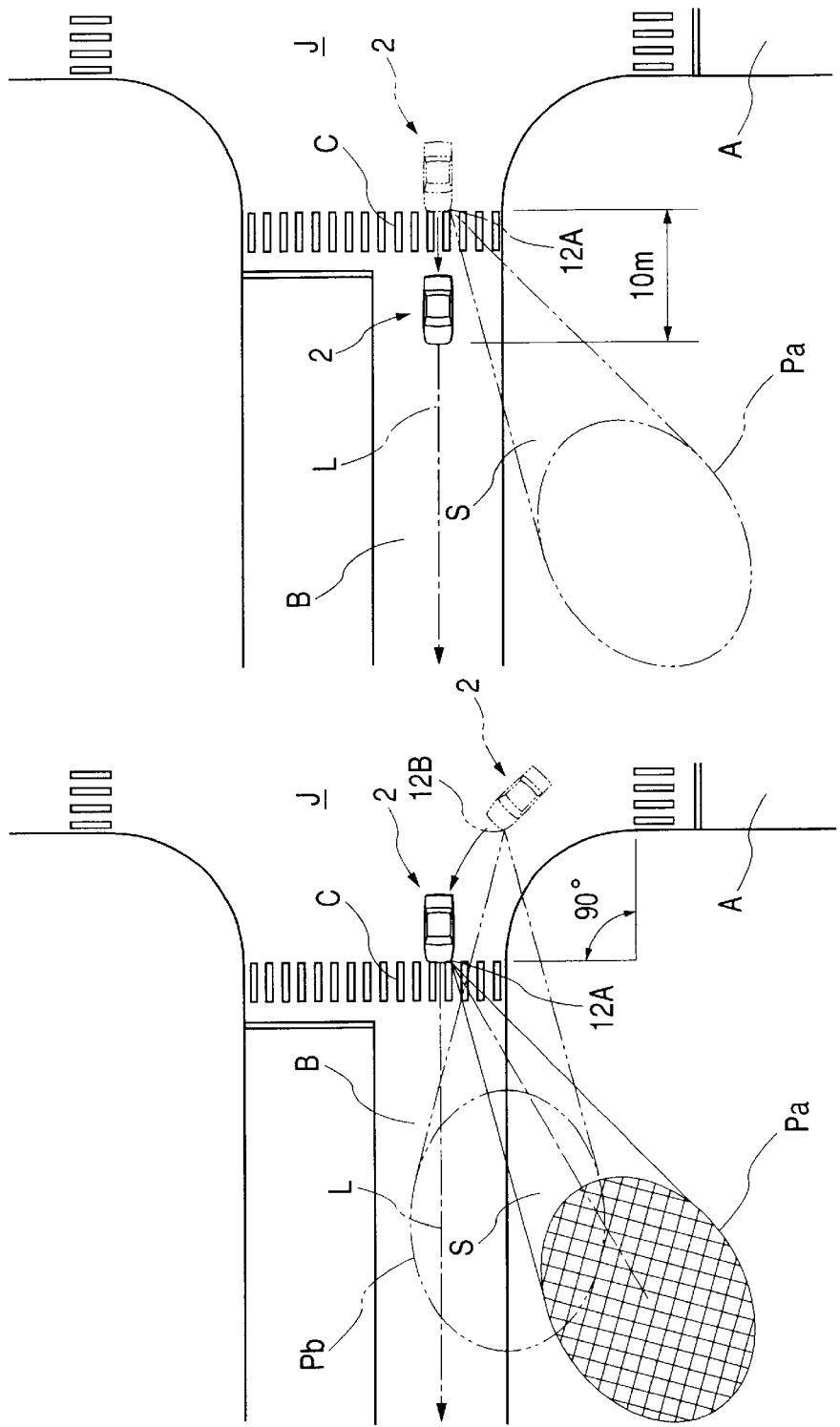

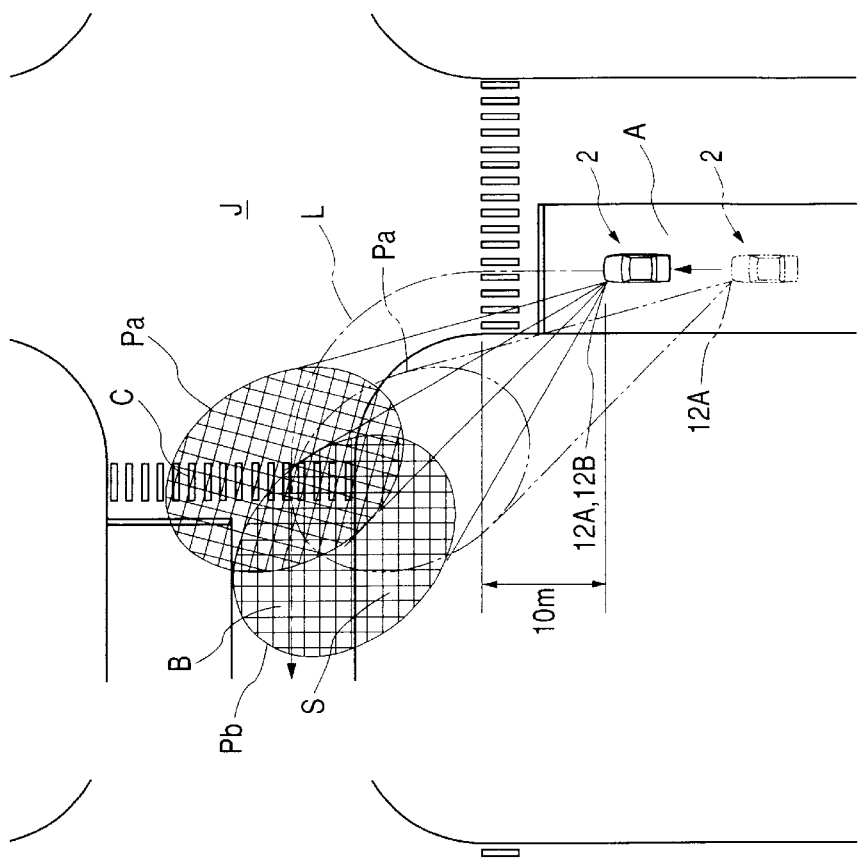
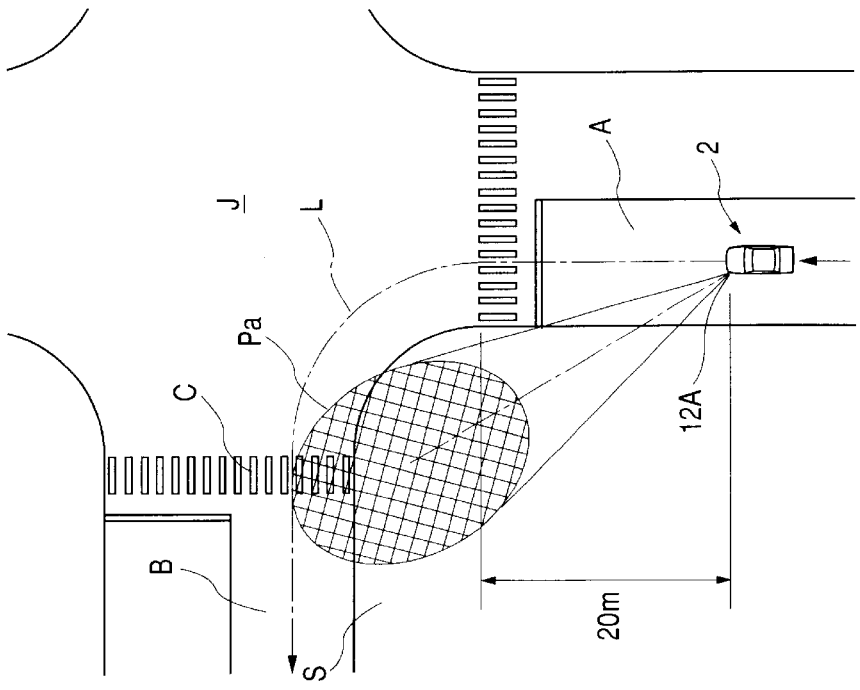

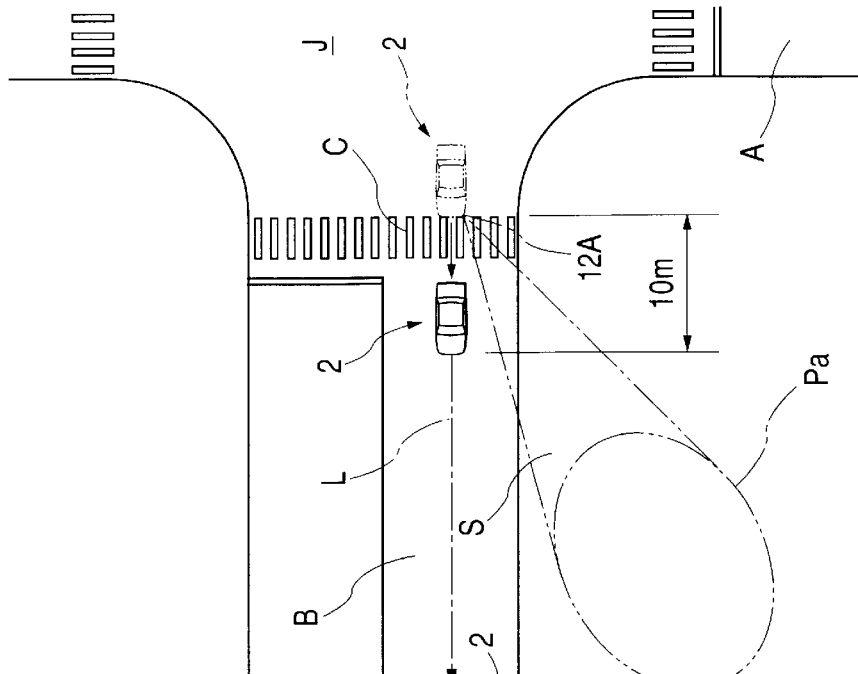
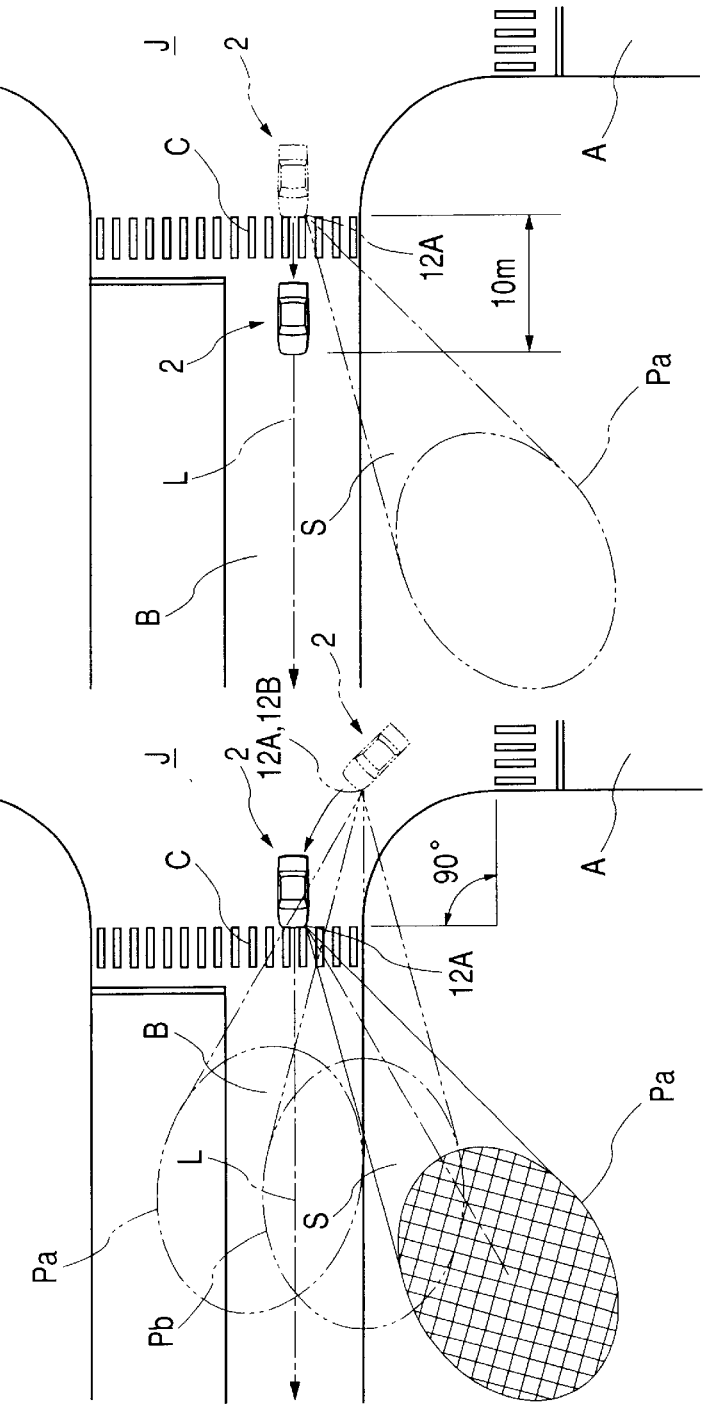
FIG. 9(a)
FIG. 9(b)

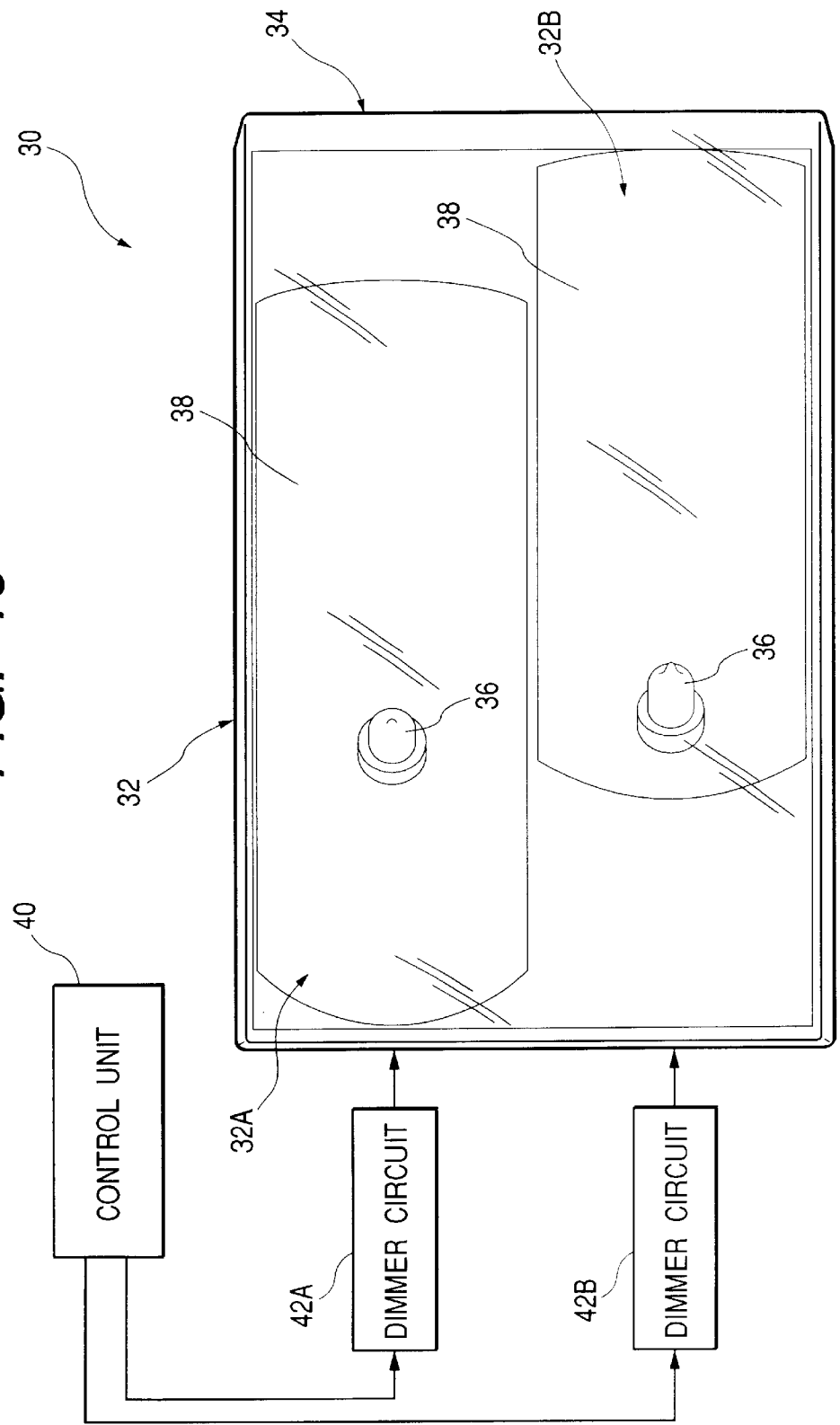

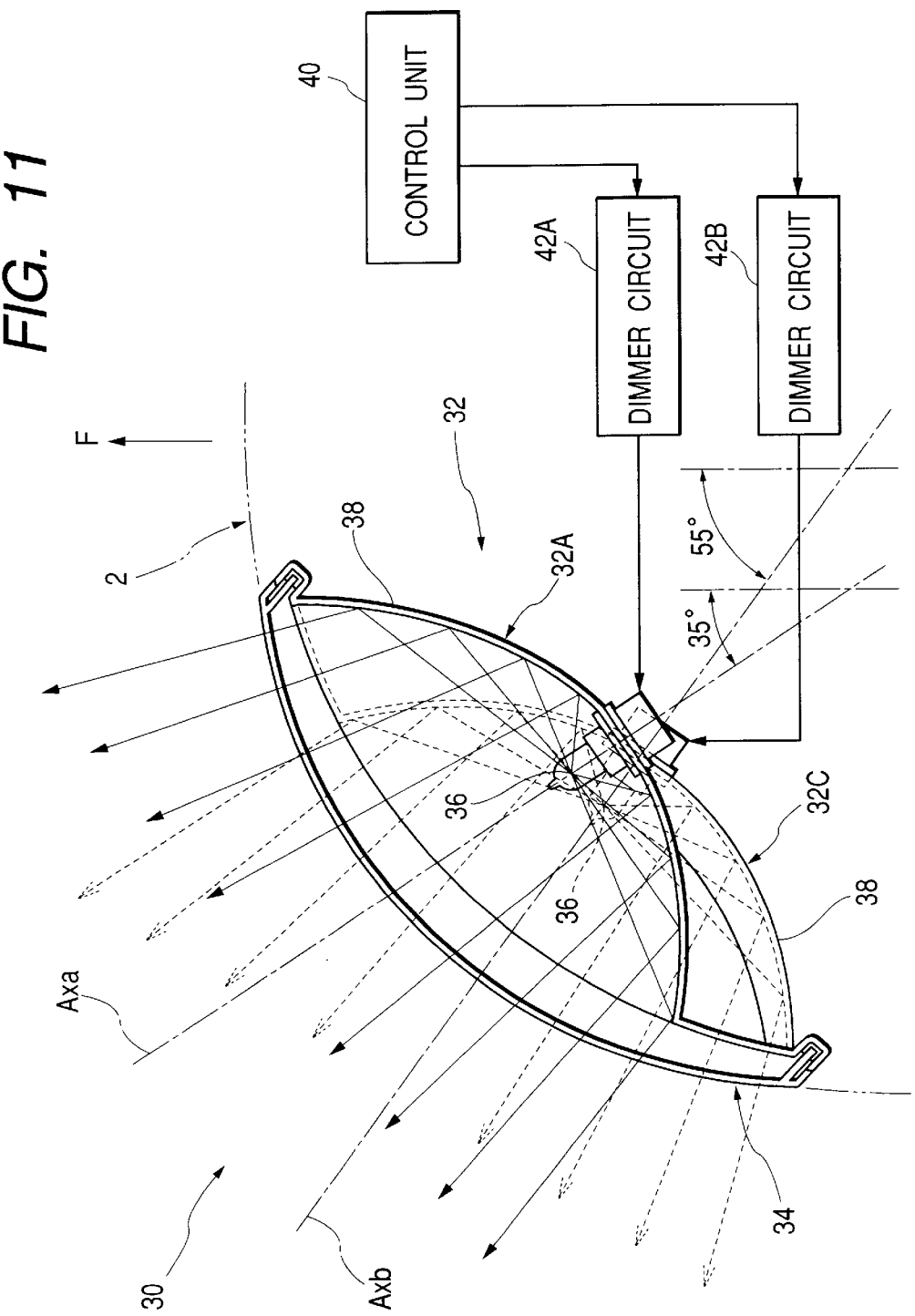

VEHICLE CORNERING LAMP

BACKGROUND OF THE INVENTION

1. Technical Field to Which the Invention Belongs

The present invention relates to a vehicle cornering lamp for irradiating a road surface ahead of, and in the oblique direction of, a vehicle.

2. Description of the Related Art

Vehicles now are often provided with cornering lamps for easily watching pedestrians and the like in the direction in which the vehicles turn right or left at intersections.

As shown in FIG. 13, a cornering lamp 110 is provided in a front end corner portion of a vehicle 2 in order to irradiate a road surface ahead of, and in the oblique direction of, the vehicle 2.

More specifically, the cornering lamp 110 is set so that the optical axis Ax may be directed to a predetermined angle from the direction F, which extends to the front of the vehicle. Further, the cornering lamp 110 is set so that the light from a light source 112 is horizontally and diffusively reflected from a reflector 114, a luminous intensity distribution P that expands horizontally around a line V—V (vertical line passing the optical axis Ax) and is directed slightly downward is formed under a line H—H (horizontal line equal in height to the light source 112) as shown on an imaginary vertical screen Sc of FIG. 13.

SUMMARY OF THE INVENTION

1. Problems to be Solved by the Invention

In the conventional cornering lamp 110, however, the horizontally-directed diffusion angle is restricted because the lamp 110 has been arranged so that the luminous intensity distribution P is formed by the light reflected from the single reflector 114. Thus, there is a problem in that it is impossible to broadly irradiate a road surface ahead of, and in the oblique direction of, the vehicle 2 moving around a curve.

An object of the present invention, made in view of the foregoing problem, is to provide a vehicle cornering lamp capable of broadly irradiating a road surface ahead of, and in the oblique direction of, a vehicle while the vehicle is moving around a curve.

2. Manner of Solving the Problems

In order to accomplish the above and other objects, the present invention comprises a plurality of reflector units different in their light emitting directions.

A vehicle cornering lamp provided in a front corner portion of a vehicle, and used for irradiating a forward road surface in the oblique direction of the vehicle, comprises:

a plurality of light source bulbs and a plurality of reflector units each having a reflector for reflecting light from a respective one of said light source bulbs, each of said reflectors having an axis, wherein the horizontal positions of the axes of the reflectors from different ones of said reflector units are set different from one another.

Each 'reflector unit' is not limited to a specific construction, but may be any reflector unit as long as the directions of light emission from these reflector units are set different from one another and the arrangement of the reflector units is also not restricted.

The 'directions of light emission from the reflector units' may be shifted in direction from one another vertically, laterally, and/or obliquely.

The plurality of 'reflector units' may be formed integrally or separately. Also, these 'reflector units' may be housed in a lamp chamber formed with a lamp body and a front cover, or otherwise may be such that the reflector units and the front cover may be used to form the cornering lamp.

3. Operation and Working Effect of the Invention

As indicated by the above-described arrangement, the vehicle cornering lamp according to the present invention comprises a plurality of reflector units, wherein the directions of light emission from these reflector units are set different from one another. Therefore, the following operation and working effect are obtainable.

More specifically, with the plurality of reflector units simultaneously switched on, a wide diffusive luminous intensity distribution—that previously was unobtainable from the conventional cornering lamp—is obtainable. Moreover, an adequate combination of the plurality of reflector units is switched on so as to obtain a luminous intensity distribution having a necessary and sufficient diffusion angle.

Therefore, the vehicle cornering lamp according to the present invention is capable of broadly irradiating the forward road surface, in the oblique direction of the vehicle, while the vehicle is moving around a curve.

The arrangement of the plurality of reflector units is not specifically restricted as described above. Instead, by arranging the reflector units in a line along the front portion of the vehicle, and by overlapping mutually adjoining reflector units formed through the light emission from the respective reflector units with respect to the horizontal direction, the luminous intensity distribution formed by the vehicle cornering lamp can be broadened horizontally while maintaining light uniformity. When the adjoining reflector units are switched on and off, the positions of the light emission on the forward road surface in the oblique direction of the vehicle smoothly are varied. Because of this smooth variation, the driver does not get a feeling of wrongness as normally produced by switching the cornering lamp on and off. Moreover, since the plurality of reflector units are arranged in a line along the front end corner portion of the vehicle, the directions of light emission from the respective reflector units can easily be set horizontally different from one another.

Alternatively, by lining up the plurality of reflector units vertically in the front end corner portion as well as making up the luminous intensity distributions formed through light emission from the reflector units such that the adjoining reflector units are mutually overlapped with respect to the horizontal direction, the forward road surface in the oblique direction of the vehicle can broadly be irradiated while the lateral width of the vehicle cornering lamp is minimized. Further, by lining up the plurality of reflector units vertically, the luminous intensity distributions formed through light emission from the reflector units can be set at a relatively large horizontal diffusion angle, so that the forward road surface in the oblique direction of the vehicle is broadly irradiated by a small number of reflector units. Consequently, as it is possible to secure a large overlapped amount of luminous intensity distributions formed through light emission from the reflector units, the movement of driver's eyes is greatly suppressed by reducing the degree of change in the light emitting position when switching of on and off conditions is made between the adjoining reflector units. Thus the driver is prevented from being given a feeling of wrongness.

Further, a light-emission control means, for controlling light emission from each of said reflector units according to the travel conditions of the vehicle, is provided to allow a broad irradiation of a necessary range of the forward road surface in the oblique direction of the vehicle moving around a curve. And this broad irradiation is made without waste. The 'travel conditions of a vehicle' means various conditional quantities regarding the travel of a vehicle, and includes external information such as, for example: vehicle speed; a steering angle; navigation data; and the like.

BRIEF DESCRIPTION OF THE DRAWINGS

The above and other objects and advantages of the present invention will become more apparent by describing in detail preferred exemplary embodiments thereof with reference to the accompanying drawings, wherein like reference numerals designate like or corresponding parts throughout the several views, and wherein:

FIGS. 4a and b are diagrams illustrating an example of emission control over each reflector unit as the vehicle moves from a first to a second position;

FIGS. 5a and b are diagrams illustrating an example of emission control over each reflector unit as the vehicle moves from the second to a third, and the third to a fourth, position;

FIGS. 6a and b are diagrams illustrating an example of emission control over each reflector unit as the vehicle moves from the fourth to a fifth, and the fifth to a sixth, position;

FIGS. 7a and b are diagrams similar to FIGS. 4a and b, but illustrate a modified example of the embodiment of the invention;

FIGS. 9a and b are diagrams similar to FIGS. 6a and b, but illustrate the modified example of the embodiment of the invention; and FIG. 10 is a front view of the vehicle Corning lamp according to the second embodiment of the invention.

FIG. 11 is a horizontal sectional view of the vehicle corning lamp according to the second embodiment of the invention with the vehicle front being turned upward.

DETAILED DESCRIPTION OF THE PREFFERRED EMBODIMENTS

1. Mode for Carrying Out the Invention

Embodiments of the present invention will now be described with reference to the drawings.

A first embodiment of the invention will be described first.

Figure 1:
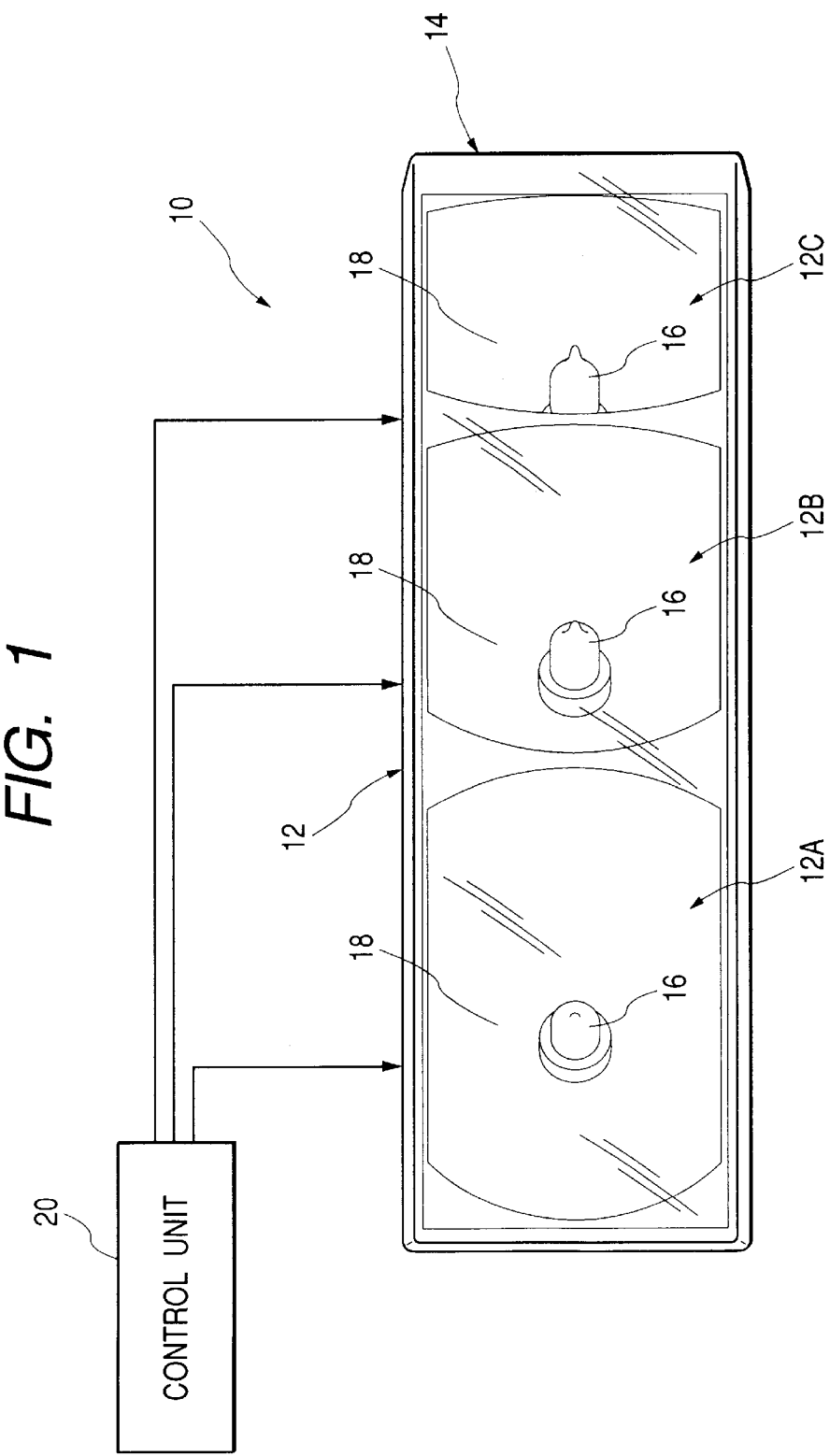
FIG. 1 is an elevational view of a vehicle cornering lamp embodying the invention, as viewed from the front of a vehicle.
Figure 2:
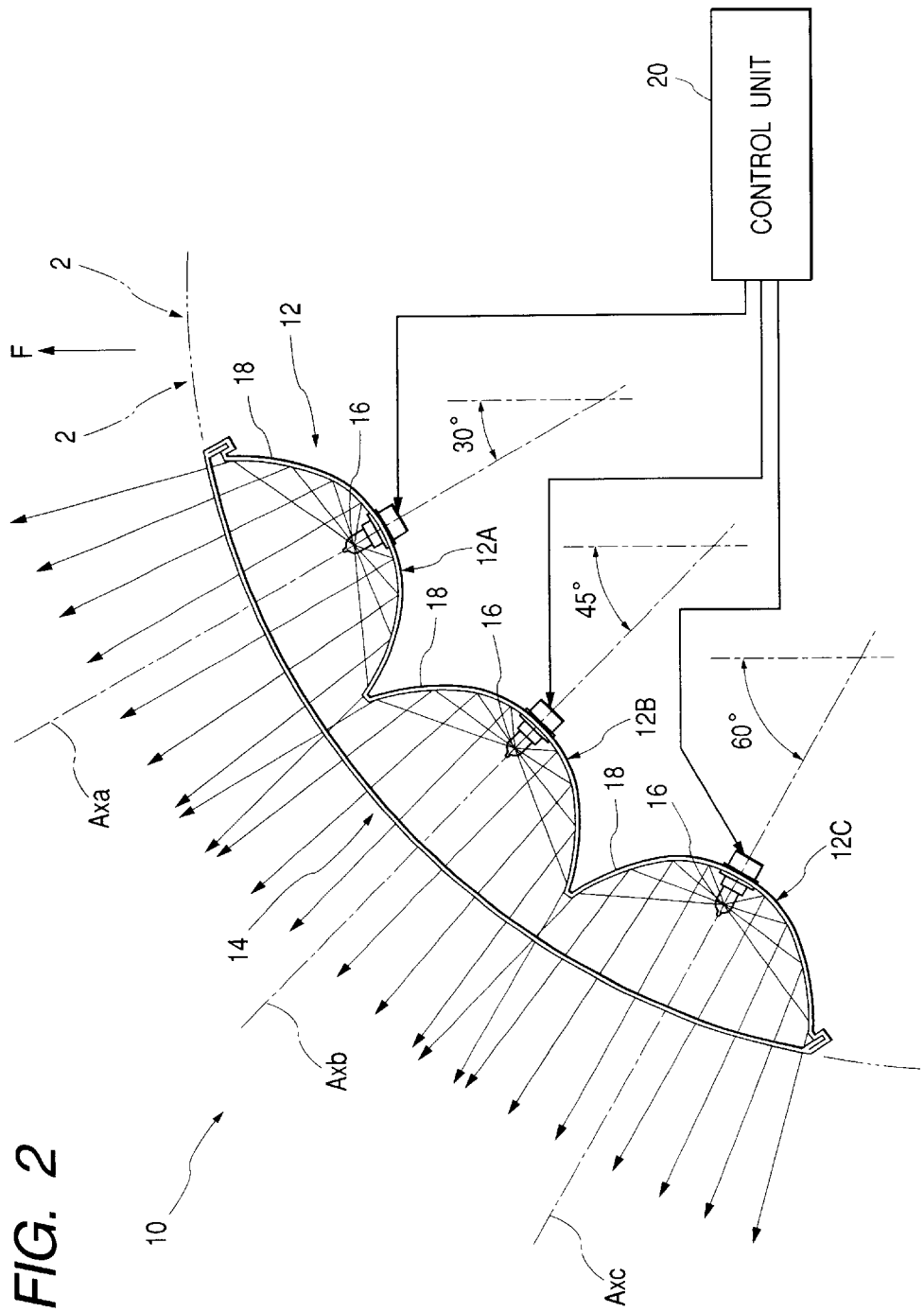
FIG. 2 is a horizontal sectional view of the vehicle wherein the front of the vehicle is pointed toward the top of the figure.

FIG. 1 is an elevational view of a vehicle cornering lamp, embodying the invention, as viewed from the front of a vehicle, whereas FIG. 2 is a horizontal sectional view of the vehicle such that its front is upward, i.e., in the direction of arrow F.

As shown in FIGS. 1 and 2, a vehicle cornering lamp 10, according to this embodiment of the invention, is a lamp provided in a front corner portion on the left side of a vehicle, and is arranged so as to irradiate a road surface ahead of and in the leftward oblique direction of a vehicle 2.

The vehicle cornering lamp 10 includes a reflector unit assembly 12, and a plain transparent front cover 14 fitted to the reflector unit assembly 12. The cornering lamp 10 is subjected to emission control performed by a control unit 20.

The reflector unit assembly 12 incorporates three reflector units 12A, 12B, and 12C, disposed in a line along the left-side front corner portion of the vehicle 2. Each of the reflector units 12A, 12B, and 12C, is formed with a light source bulb 16 and a reflector 18. Further, the optical axes Axa, Axb, and Axc, of the respective reflector units 12A, 12B, and 12C, are respectively set to point to angles of 30°, 45° and 60°, with respect to the forward direction F of the vehicle.

Each light source bulb 16 is a halogen bulb, and each of the reflector units 12A, 12B, and 12C, is used to horizontally and diffusively reflect light from each light source bulb 16.

Figure 3:
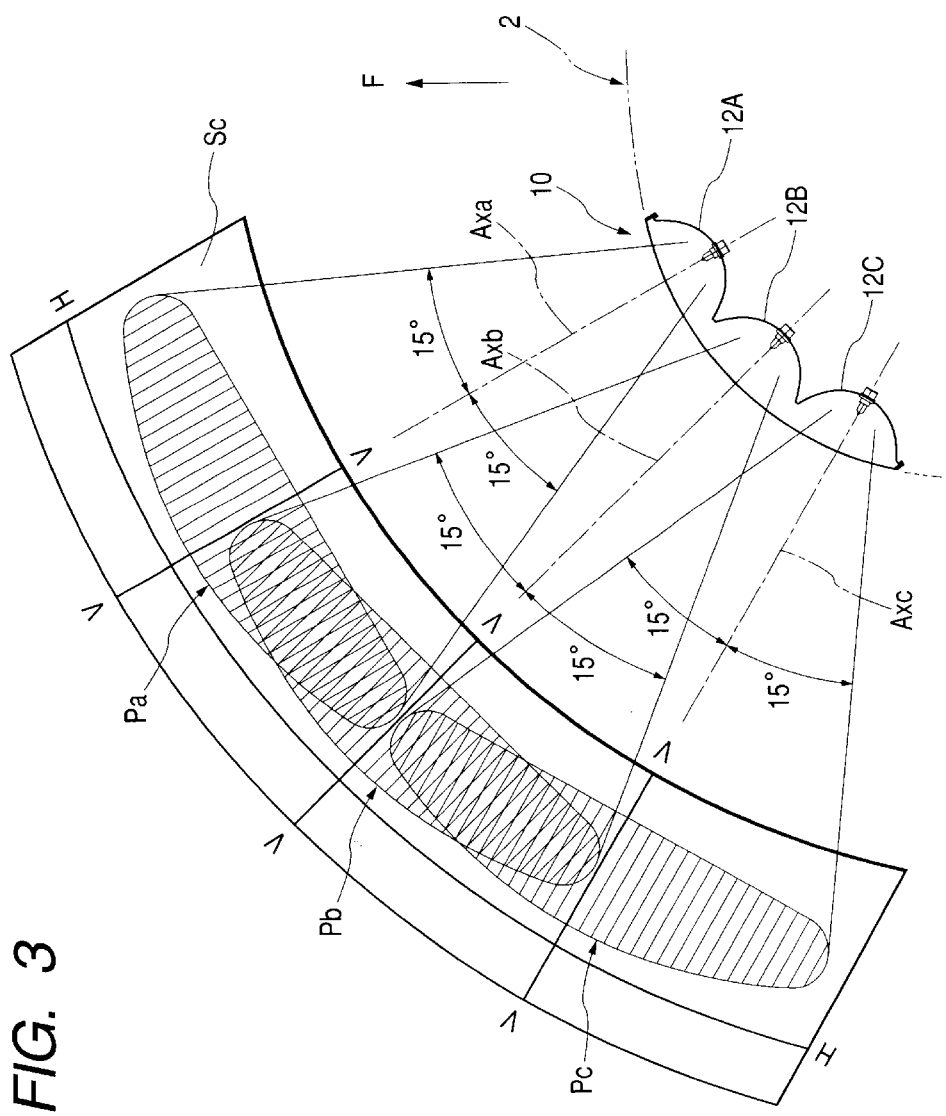
FIG. 3 is a diagram illustrating luminous intensity distributions, which are formed on an imaginary vertical screen by the light emitted from the three respective reflector units forming the vehicle cornering lamp.

FIG. 3 shows luminous intensity distributions Pa, Pb, and Pc, which are formed on an imaginary vertical screen Sc by the light emitted from the respective reflector units 12A, 12B, and 12C.

As shown in FIG. 3, the luminous intensity distributions Pa, Pb, and Pc, are formed such that these distributions expand horizontally around respective optical axes Axa, Axb, and Axc, at about 15° on each side, and such that these distributions are directed slightly downward.

More specifically, the reflector unit 12A is used to irradiate the road surface obliquely positioned about 20 to about 40 meters ahead of the vehicle in the direction of the optical axis Axa, and to irradiate within the sideward range of about 15° to about 45° with respect to the direction F to the front of the vehicle; the reflector unit 12B is used to irradiate the road surface obliquely positioned about 20 to about 40 meters ahead of the vehicle in the direction of the optical axis Axb, and to irradiate within the sideward range of about 30° to about 60° with respect to the direction F to the front of the vehicle; and the reflector unit 12C is used to irradiate the road surface obliquely positioned about 20 to about 40 meters ahead of the vehicle in the direction of the optical axis Axc, and to irradiate within the sideward range of about 45° to about 75° with respect to the direction F to the front of the vehicle. When these three reflector units 12A, 12B, and 12C, simultaneously are switched on, they collectively irradiate the road surface obliquely ahead of the vehicle within the sideward range of about 15° to about 75 ° with respect to the direction F to the front of the vehicle.

The control unit 20 performs emission control by selectively turning on and off the reflector units 12A, 12B, and 12C, at a predetermined timing according to the travel conditions of the vehicle. The control unit 20 is connected to a vehicle speed sensor, a steering angle sensor, a position-measuring sensor, and the like. According to the signal detected from each of the sensors, the present location, travel speed, travel direction of the vehicle 2, and the like, which are needed for light-emission control, are calculated.

FIGS. 4, 5 and 6 are diagrams illustrating an example of the manner in which control unit 20 controls the light emission from each of the reflector units 12A, 12B, and 12C.

In this example of light-emission control, a vehicle is assumed to be traveling along line L, as shown by a chain line in FIG. 4(a). When the vehicle 2 proceeds toward an intersection J, from its traveling road A, and turns left at the intersection J so as to move along a traveling road B, it is possible for the driver to attentively and quickly detect pedestrians—who are crossing (or who are trying to cross) the traveling road B along a pedestrian crossing C and so on—by irradiating the traveling road B and a road shoulder S on this side (particularly, the vicinity of the pedestrian crossing C closer to the intersection J—a first side). In this case, a description will be given on the assumption that the vehicle 2 travels along line L when it turns left at the intersection J.

First, as shown in FIG. 4(a), when the vehicle 2 reaches a position about 20 meters on the first side of the intersection J while it is moving straight on the traveling road A toward the intersection J, the reflector unit 12A is switched on so as to form the luminous intensity distribution Pa near the road shoulder S on the first side of the pedestrian crossing C (which side corresponds to the first side of the intersection J) by irradiating an area spanning an angle from about 15° to about 45° with respect to the travel direction of the vehicle. Also, a target position of light emission is slowly shifted because the luminous intensity distribution Pa is moved forward as the vehicle 2 is moved forward.

Next, as shown in FIG. 4(b), when the vehicle 2 reaches a position about 10 meters on the first side of the intersection J, the reflector unit 12A is switched off and the reflector unit 12B is switched on so as to form the luminous intensity distribution Pb from the road shoulder S on the first side of the pedestrian crossing C to the opposite side of the adjoining traveling road B by changing the light emitting pattern to an area spanning an angle from about 30° to about 60° with respect to the travel direction of the vehicle.

As shown in FIG. 5(a), the luminous intensity distribution Pb is also moved forward as the vehicle 2 moves forward, so that when the vehicle 2 reaches a position near the intersection J, the reflector unit 12B is switched off and the reflector unit 12C is switched on. Thus, the luminous intensity distribution Pc is formed from the road shoulder S on the first side of the pedestrian crossing C to a point over the traveling road B in front of that shoulder S by changing the light emitting pattern to an area spanning an angle from about 45° to about 75° with respect to the travel direction of the vehicle.

As the vehicle 2 turns to the left at the intersection J, the luminous intensity distribution Pc is also turned left while the vehicle 2 moves around the curve so as to make the light emitting position deviate from the target position. Therefore, as shown in FIG. 5(b), the reflector unit 12C is switched off and the reflector unit 12B is switched on again when the vehicle 2 reaches a position wherein it turns to the left by half at the intersection J (i.e., where the vehicle turns by 45° around the center of curvature of the vehicle's travel line L). Thus, the luminous intensity distribution Pb is formed on the traveling road B, positioned forward to a certain degree from the pedestrian crossing C, and is formed over the left-side road shoulder S, by changing the light emitting pattern to the area spanning an angle from about 45° to about 60° with respect to the travel direction of the vehicle.

As shown in FIG. 6(a), when the vehicle 2 reaches a position where it starts running straight along the traveling road B—after completing its movement around the curve at the intersection J (i.e., where the vehicle turns by 90° around the curvature center of the vehicle travel line L)—the reflector unit 12B is switched off and the reflector unit 12A is switched on again. Thus, the luminous intensity distribution Pa is formed on the left-side road shoulder S, of the traveling road B, by changing the light emitting pattern to the area spanning an angle from about 15° to about 45° with respect to the travel direction of the vehicle.

Further, as shown in FIG. 6(b), when the vehicle 2 reaches a position about 10 meters away from the intersection J—after starting to move straight along the traveling road B—the reflector unit 12A is also switched off because the light emission from the cornering lamp 10 becomes unnecessary.

As described above in detail, the vehicle cornering lamp 10 according to this embodiment of the invention comprises the three reflector units 12A, 12B, and 12C, and the control unit 20. The reflector units 12A, 12B, and 12C, have light emitting directions that are respectively set to angles of 30°, 45°, and 60°, with respect to the travel direction of the vehicle. Also, the three reflector units 12A, 12B, and 12C, produce light emitting patterns that are respectively set to areas spanning angles from about 15° to about 45°, about 30° to about 60°, and about 45° to about 75°, with respect to the travel direction of the vehicle. The control unit 20 is for controlling the light emission from the reflector units 12A, 12B, and 12C, whereby the following operation and working-effect are obtainable.

The traveling road B ahead of the vehicle (onto which the vehicle will turn left) and the road shoulder S (on the first side of the intersection J, particularly in the vicinity of the pedestrian crossing C) can sufficiently be irradiated by switching on the reflector units 12A, 12B, and 12C, in the order of 12A→12B→12C→12B→12A as the vehicle turns to the left at the intersection J. Therefore, pedestrians who are crossing, or who are about to cross, the traveling road B by moving along the pedestrian crossing C can quickly be detected. Moreover, the range of the forward road surface onto which the vehicle will travel, and which is in the direction oblique to the current travel direction of the vehicle 2, can be irradiated broadly by successively switching on the three reflector units 12A, 12B, and 12C, while maintaining power consumption equivalent to that of the conventional cornering lamp.

Further, since the three reflector units 12A, 12B, and 12C, are lined up along the front corner portion of the vehicle, they can be arranged horizontally in different light emitting directions.

The luminous intensity distributions Pa, Pb, and Pc, are formed by the light emission from the reflector units 12A, 12B, and 12C. And the reflector units 12A, 12B, and 12C, are arranged such that the adjoining luminous intensity distributions Pa and Pb, and the adjoining luminous intensity distributions Pb and Pc are overlapped (substantially by half the distribution) with respect to the horizontal direction. Therefore, the positions of the light emission on the forward road surface, in the oblique direction of the vehicle 2, are smoothly varied when these three reflector units 12A, 12B, and 12C, sequentially are switched on in the order of 12A→12B→12C→12B→12A, whereby the driver does not have a feeling of wrongness when the cornering lamp is turned on and off.

A modified example of the light-emission control—performed by the control unit 20 over each of the reflector units 12A, 12B, and 12C—will now be described.

FIGS. 7, 8, and 9, show the modified example of emission control. Incidentally, the travel conditions of the vehicle in this modified example are essentially the same as those in the above-described embodiment of the invention.

First, as shown in FIG. 7(a), when the vehicle 2 reaches a position about 20 meters on the first side of the intersection J while moving straight on the traveling road A toward the intersection J, the reflector unit 12A is switched on so as to form the luminous intensity distribution Pa near the road shoulder S on the first side of the pedestrian crossing C by irradiating an area spanning an angle from about 15° to about 45° with respect to the travel direction of the vehicle. Also, a target position of light emission is slowly shifted because the luminous intensity distribution Pa is moved forward as the vehicle 2 moves forward.

Then, as shown in FIG. 7(b), when the vehicle 2 reaches a position about 10 meters on the first side of the intersection J, the reflector unit 12B is additionally switched on, with the reflector unit 12A being kept on, so as to form the luminous intensity distributions Pa and Pb from the road shoulder S on the first side of the pedestrian crossing C to a point over the adjoining traveling road B, by broadening the light emitting pattern to an area spanning an angle from about 15° to about 60° with respect to the travel direction of the vehicle.

Figure 8A:
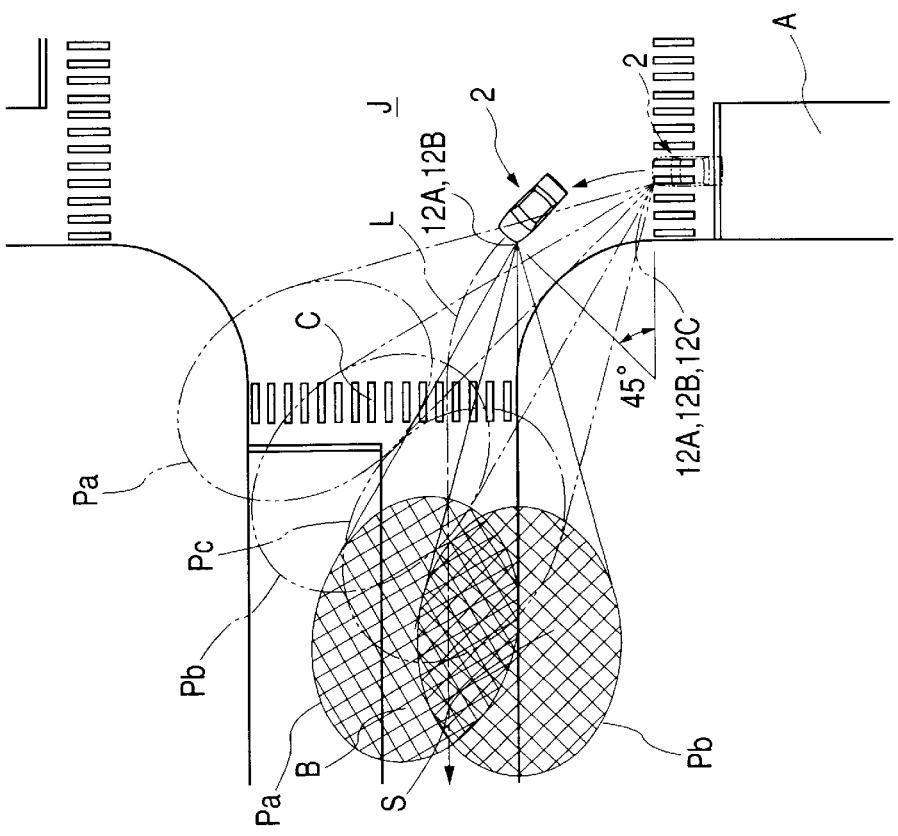
FIGS. 8a and b are diagrams similar to FIGS. 5a and b, but illustrate the modified example of the embodiment of the invention.

Also, as shown in FIG. 8(a), the luminous intensity distributions Pa and Pb are moved forward as the vehicle 2 travels forward. Therefore, when the vehicle 2 reaches a position near the intersection J, the reflector unit 12C is additionally switched on while the reflector units 12A and 12B are kept on. Thus, the luminous intensity distributions Pa, Pb, and Pc, are formed from the pedestrian crossing C and the road shoulder S (on is the first side of the pedestrian crossing C) to a point over the traveling road B in front of that shoulder S, by further widening the light emitting pattern to an area spanning an angle from about 15° to about 75° with respect to the travel direction of the vehicle.

Figure 8B:
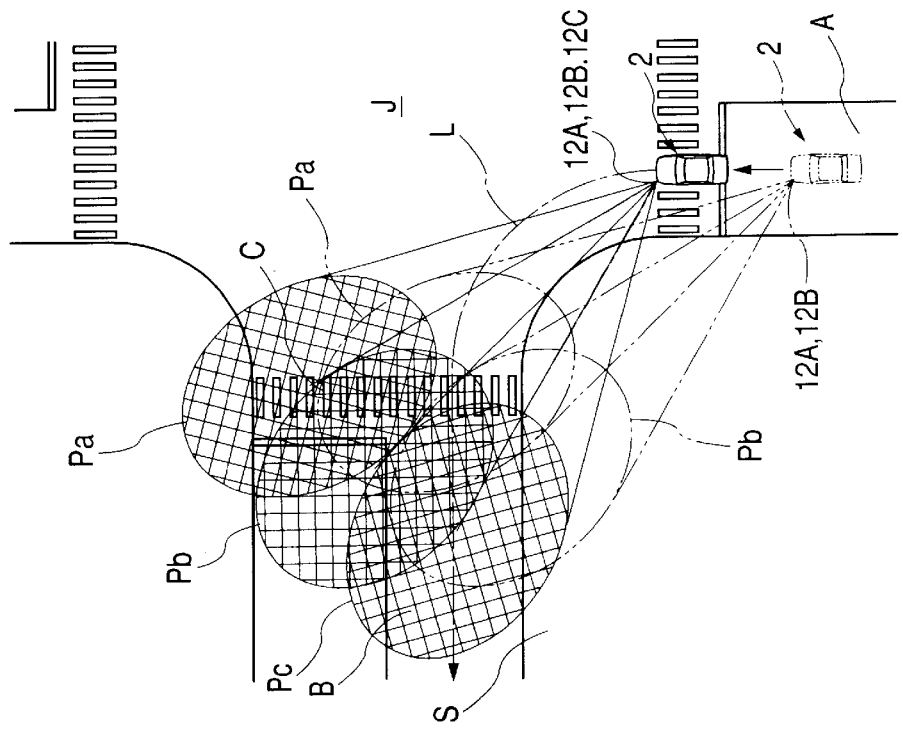

As the vehicle 2 turns to the left at the intersection J, the luminous intensity distributions Pa, Pb, and Pc, are also turned left while the vehicle 2 moves around the curve so that part of the light emitting pattern deviates from the target position. Therefore, as shown in FIG. 8(b), the reflector unit 12C is switched off—whereby only the reflector units 12A and 12B are switched on—when the vehicle 2 reaches a position where it turns to the left by half at the intersection J (i.e., where the vehicle turns by 45° around the center of curvature of the vehicle's travel line L). Thus, the luminous intensity distributions Pa and Pb are formed on the traveling road B at a point positioned forward from the pedestrian crossing C, and are formed over the left-side road shoulder S by narrowing the light emitting pattern to an area spanning an angle from about 15° to about 60° with respect to the travel direction of the vehicle.

As shown in FIG. 9(a), when the vehicle 2 reaches a position wherein it starts moving straight along the traveling road B—after having completed its movement around the curve at the intersection J (i.e., where the vehicle turns by 90° around the center of curvature of the vehicle's travel line L)—the reflector unit 12B is switched off so that only the reflector unit 12A is switched on. Thus, the luminous intensity distribution Pa is formed on the left-side road shoulder S of the traveling road B, by changing the light emitting pattern to an area spanning an angle from about 15° to about 45° with respect to the travel direction of the vehicle.

Further, as shown in FIG. 9(b), when the vehicle 2 reaches a position about 10 meters away from the intersection J—after starting to move straight along the traveling road B—the reflector unit 12A is also switched off because light emission from the cornering lamp 10 becomes unnecessary.

The number of switched-on reflector units 12A, 12B and 12C is increased or decreased according to the travel conditions of the vehicle in this modified example of light-emission control. Therefore, it is ensured that areas in the positions of the light emission are broadly irradiated, even though power consumption becomes slightly greater than that of the conventional cornering lamp.

The luminous intensity distributions Pa, Pb, and Pc, are formed by the light emission from the reflector units 12A, 12B, and 12C. And the reflector units are arranged such that the adjoining luminous intensity distributions Pa and Pb, and the adjoining luminous intensity distributions Pb and Pc, are overlapped (substantially by half the distribution) with respect to the horizontal direction. Therefore, the positions of the light emission on the forward road surface, in the oblique direction of the vehicle 2, are smoothly varied when these three reflector units 12A, 12B, and 12C, are switched on in the order of 12A→12A+12B→12A+12B+12C→12A+12B→12A, whereby the driver does not have a feeling of wrongness when the cornering lamp is switched on and off.

The above embodiments have been arranged to switch on the three reflector units 12A, 12B, and 12C, one after another, or to increase or decrease the number of these switched-on reflector units. However, all of these three reflector units 12A, 12B, and 12C, may be switched on together when the light emission from the cornering lamp is needed. In this case, though power consumption grows larger than that of the conventional cornering lamps, the forward road surface, in the oblique direction of the vehicle, is irradiated broadly.

The cornering lamp 10, in the above-described embodiment and modified example of the invention, is provided with the reflector units 12A, 12B, and 12C. However, the provision of two, or four, or more, reflector units can achieve a similar operation and working effect.

A second embodiment of the invention will now be described.

FIG. 10 is an elevational view of a vehicle cornering lamp embodying the invention as viewed from the front of a vehicle, and FIG. 11 a horizontal sectional view of the vehicle cornering lamp with the vehicle front being turned upward.

As shown in FIGS. 10 and 11, a vehicle cornering lamp 30 according to this embodiment of the invention is also a lamp provided in a front end corner portion on the left side of a (four-wheeled) vehicle and arranged so as to irradiate a road surface ahead of and in the leftward oblique direction of a vehicle 2.

The vehicle cornering lamp 30 includes a reflector unit assembly 32 and a plain transparent front cover 34 fitted to the reflector unit assembly 32 and is subjected to the emission control performed by a control unit 40 (emission control means) via dimmer circuits 42A and 42B.

The reflector unit assembly 32 incorporates two reflector units 32A and 32B lined up vertically in the left-side front end corner portion of the vehicle 2. Each of the reflector units 32A and 32B is formed with a light source bulb 36 and a reflector 38 and their optical axes Axa and Axb are respectively set to point to 35° and 55° sideway forward F with respect to the vehicle. The horizontal section of FIG. 11 is a horizontal section of the reflector unit 32A situated on the upper side.

Each light source bulb 36 is a halogen bulb and each of the reflector units 32A and 32B is used to reflect light from each light source bulb 36 horizontally and diffusively.

Figure 12:
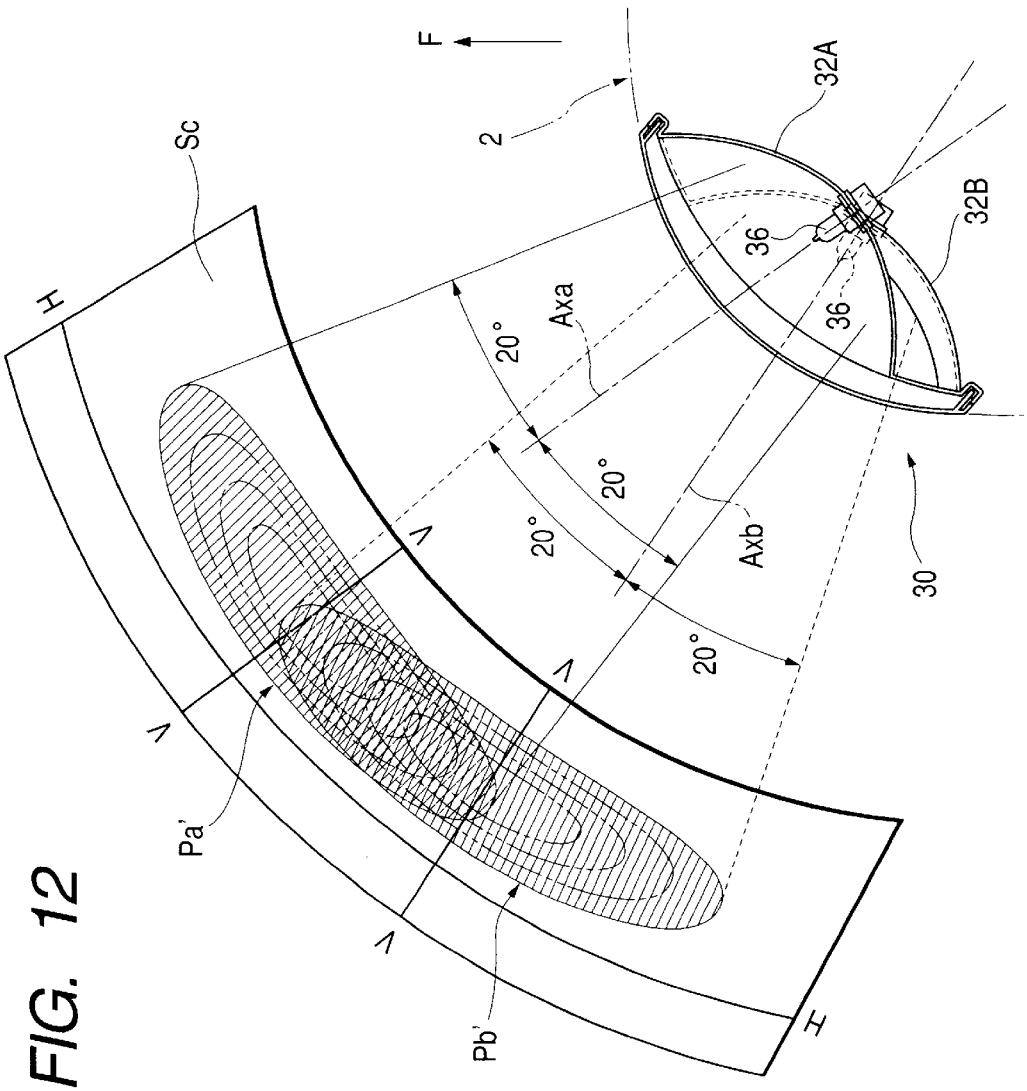
FIG. 12 is a drawing showing luminous intensity distributions which are formed on an imaginary vertical screen by the light emitted from two reflector units constituting the vehicle cornering lamp according to the second embodiment of the invention.
Figure 13:
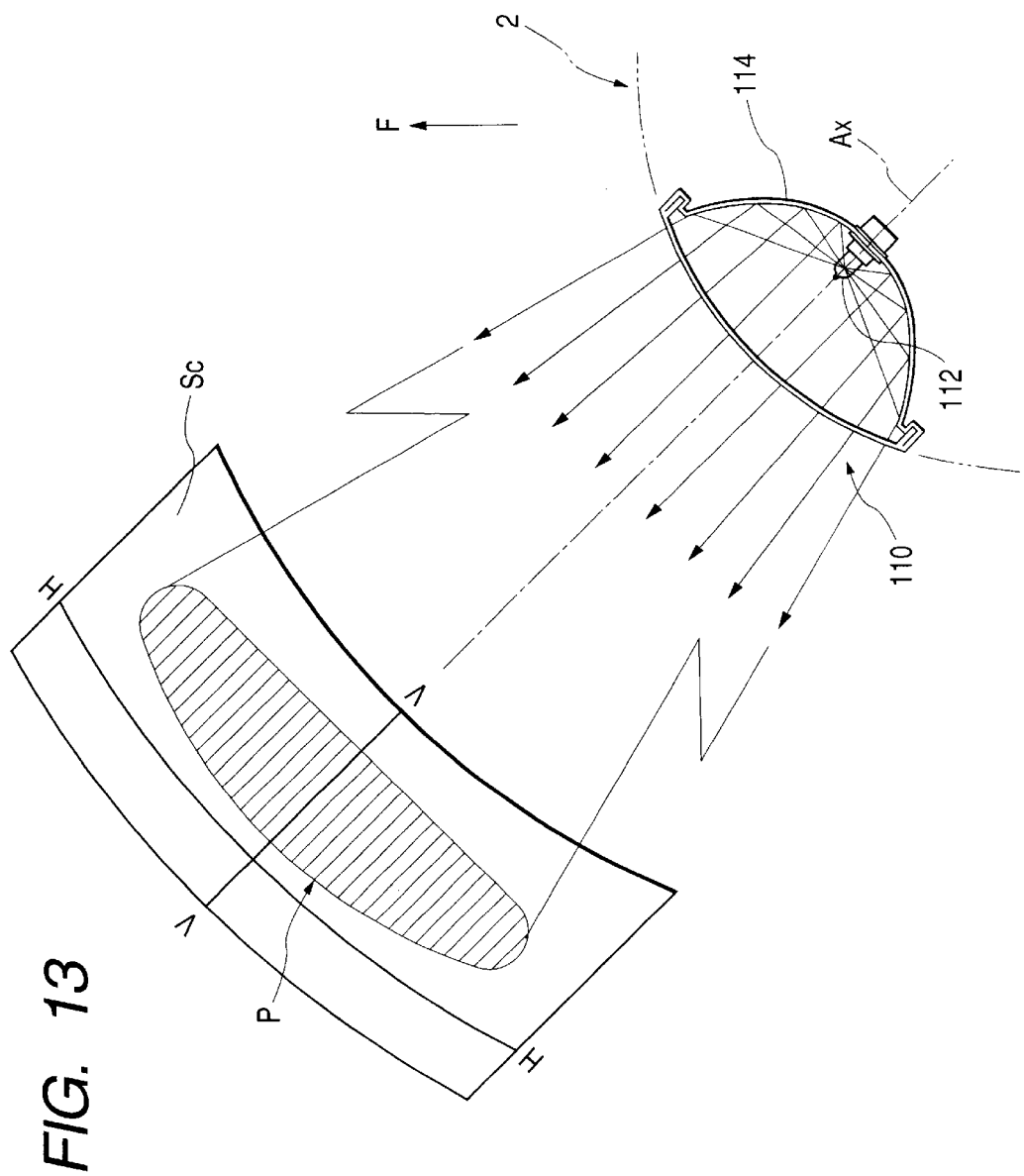
FIG. 13 is a sectional plan view of a conventional cornering lamp, wherein the viewpoint is similar to that as shown in FIG. 2.

FIG. 12 shows luminous intensity distributions Pa' and Pb' which are formed on an imaginary vertical screen Sc by the light emitted from the respective reflector units 32A and 32B.

As shown in FIG. 12, the luminous intensity distributions Pa' and Pb' are formed such that these distributions expand horizontally around optical axes Axa and Axb at about 20° on one side and are directed slightly downward, respectively.

More specifically, the reflector unit 32A is used to irradiate the road surface obliquely positioned about 20–40 meters ahead of the vehicle in the direction of the optical axis Axa within the sideways range of about 15–55° ahead F of the vehicle; and the reflector unit 32B is used to irradiate the road surface obliquely positioned about 20–40 meters ahead of the vehicle in the direction of the optical axis Axb within the sideways range of about 35–75° ahead F of the vehicle. When these two reflector units 32A and 32B are simultaneously switched on, it is arranged to irradiate the road surface obliquely ahead within the sideways range of about 15–75° ahead F of the vehicle.

The control unit 40 performs emission control by selectively turning on and off the reflector units 32A and 32B at a predetermined timing according to the travel conditions of the vehicle and adjusting the beam intensity of the reflector units 32A and 32B via the respective dimmer circuits 42A and 42B. The control unit 40 is connected to a vehicle speed sensor, a steering angle sensor, a position-measuring sensor (not shown) and the like, and according to the signal detected from each of the sensors, the present location, travel speed, travel direction of the vehicle 2 and the like needed for emission control are calculated.

Although the luminous intensity distributions Pa' and Pb' become as great as shown by solid lines when the beam intensity is maximized, they are gradually reduced as shown by chain double-dashed lines when the beam intensity is decreased by dimmering. The control unit 40 also properly varies the beam intensity ratio between the luminous intensity distributions Pa' and Pb' via the dimmer circuits 42A and 42B so as to set a luminous intensity pattern configuration fit for the travel conditions of the vehicle by synthesizing both the luminous intensity distributions.

As described in detail, the vehicle cornering lamp 30 according to this embodiment of the invention comprises the two reflector units 32A and 32B whose light emitting directions are respectively set ahead F of and in the 35° and 55° side directions of the vehicle, and the control unit 40 for controlling the light emission from the reflector units 32A and 32B, whereby the road surface obliquely ahead of the vehicle can broadly be irradiated while the vehicle is running around a curve as in the first embodiment of the invention.

Particularly according to the this embodiment of the invention, since two of the reflector units 32A and 32B are vertically lined up in the front end corner portion and the luminous intensity distributions Pa' and Pb' formed through light emission from the respective reflector units 32A and 32B are such that the adjoining reflector units 32A and 32B are mutually overlapped with respect to the horizontal direction, the forward road surface in the oblique direction of the vehicle 2 can broadly be irradiated while the lateral width of the vehicle cornering lamp 30 is minimized.

Further, by lining up two of the reflector units 32A and 32B vertically according to the this embodiment of the invention, the luminous intensity distributions Pa' and Pb' formed through light emission from the reflector units can be set at a relatively large horizontal diffusion angle, so that the forward road surface in the oblique direction of the vehicle 2 is broadly irradiated even by the two reflector units 32A and 32B. Consequently, as it is possible to secure a large overlapped amount (to be concrete, over half the overlapped amount) of luminous intensity distributions Pa' and Pb' formed through light emission from the reflector units 32A and 32B, the movement of driver's eyes is greatly suppressed by reducing the degree of change in the light emitting position when switching of on and off conditions is made between the adjoining reflector units 32A and 32B. Thus the driver is prevented from being given a feeling of wrongness.

According to this embodiment of the invention, further, since the configuration of the synthesized luminous intensity distribution is allowed to be set to what is fit for the travel conditions of the vehicle by properly varying the beam intensity ratio between the luminous intensity distributions Pa' and Pb', a necessary range of the road surface obliquely ahead of the vehicle 2 can broadly be irradiated with the minimum required power consumption.

The above-described embodiment and modified example set forth a case where the cornering lamp 10, 30 is provided in the left-side front corner portion of the vehicle 2, the provision of a cornering lamp in the right-side front corner portion of the vehicle 2 also can achieve a similar operation and working effect by employing a bilateral symmetric form of the cornering lamp 10, 30. A cornering lamp provided in the right-side front corner portion can be used for irradiating a forward road surface in the rightward oblique direction of the vehicle 2. However, because the radius of curvature during a turn to the right tends to be greater than that during a turn to the left (on a keep-to-the-left road), the positions of light emission from the respective reflector units 12A, 12B, 12C, 32A, and 32B, may be set slightly farther than those of light emission from the cornering lamp 10, 30 provided in the left-side front corner portion.

The present invention is not limited to the specific above-described embodiments. It is contemplated that numerous modifications may be made to the vehicle cornering lamp of the present invention without departing from the spirit and scope of the invention as defined in the following claims.

What is claimed is:

1. A vehicle cornering lamp provided in a front corner portion of a vehicle and used for irradiating a forward road surface in a direction oblique to a current travel direction of the vehicle, comprising:
   a plurality of light source bulbs and a plurality of reflector units each having a reflector for reflecting light from a respective one of said light source bulbs, each of said reflectors having an axis, and light control means for controlling light emission, from each of said reflector units, according to the travel conditions of the vehicle
   wherein the horizontal positions of the axes of the reflectors from different ones of said reflector units are angularly displaced from one another.

2. A vehicle cornering lamp provided in a front corner portion of a vehicle and used for irradiating a forward road surface in a direction oblique to a current travel direction of the vehicle, comprising:
   a plurality of light source bulbs and a plurality of reflector units each having a reflector for reflecting light from a respective one of said light source bulbs, each of said reflectors having an axis, and light-emission control means for sequentially controlling light emission from each of said light source bulbs;
   wherein the horizontal positions of the axes of the reflectors from different ones of said reflector units are angularly displaced from one another.

3. A vehicle cornering lamp provided in a front corner portion of a vehicle and used for irradiating a forward road surface in a direction oblique to a current travel direction of the vehicle, comprising:
   a plurality of light source bulbs and a plurality of reflector units each having a reflector for reflecting light from a respective one of said light source bulbs, each of said reflectors having an axis, wherein the horizontal positions of the axes of the reflectors from different ones of said reflector units are angularly displaced from one another; and said plurality of light source bulbs are positioned so as to be capable of simultaneous illumination to provide said irradiation of said forward road surface.

4. A vehicle cornering lamp according to claims 1, 2 or 3, wherein said plurality of reflector units are arranged in a line along said front corner portion, and wherein luminous intensity distributions are formed by light emission from respective ones of said plurality of reflector units, and said plurality of reflector units are arranged such that luminous intensity patterns from adjacent ones of said plurality of reflector units are mutually overlapped with respect to the horizontal direction.

5. A vehicle cornering lamp according to claims 1, 2 or 3, wherein said plurality of reflector units are vertically lined up in said front corner portion and wherein luminous intensity distributions are formed by light emission from respective ones of said plurality of reflector units, and said plurality of reflector units are arranged such that luminous intensity patterns from adjacent ones of said plurality of reflector units are mutually overlapped with respect to the horizontal direction.

6. A vehicle cornering lamp according to claims 1, 2 or 3, wherein each of the horizontal positions of the axes of the reflectors are successively angularly displaced from one another.

7. A vehicle cornering lamp as claimed in claim 6, wherein said angular displacement is at regular intervals.

8. A vehicle cornering lamp as claimed in claim 7, wherein said regular intervals are approximately 15°.

9. A vehicle cornering lamp according to claims 1, 2 or 3, wherein mounting directions of said plurality of light source bulbs are angularly displaced from one another.

10. A vehicle cornering lamp according to claims 1, 2 or 3, wherein each of said plurality of light source bulbs are connected to a common control unit.

* * * * *